UNITED STATES PATENT OFFICE.

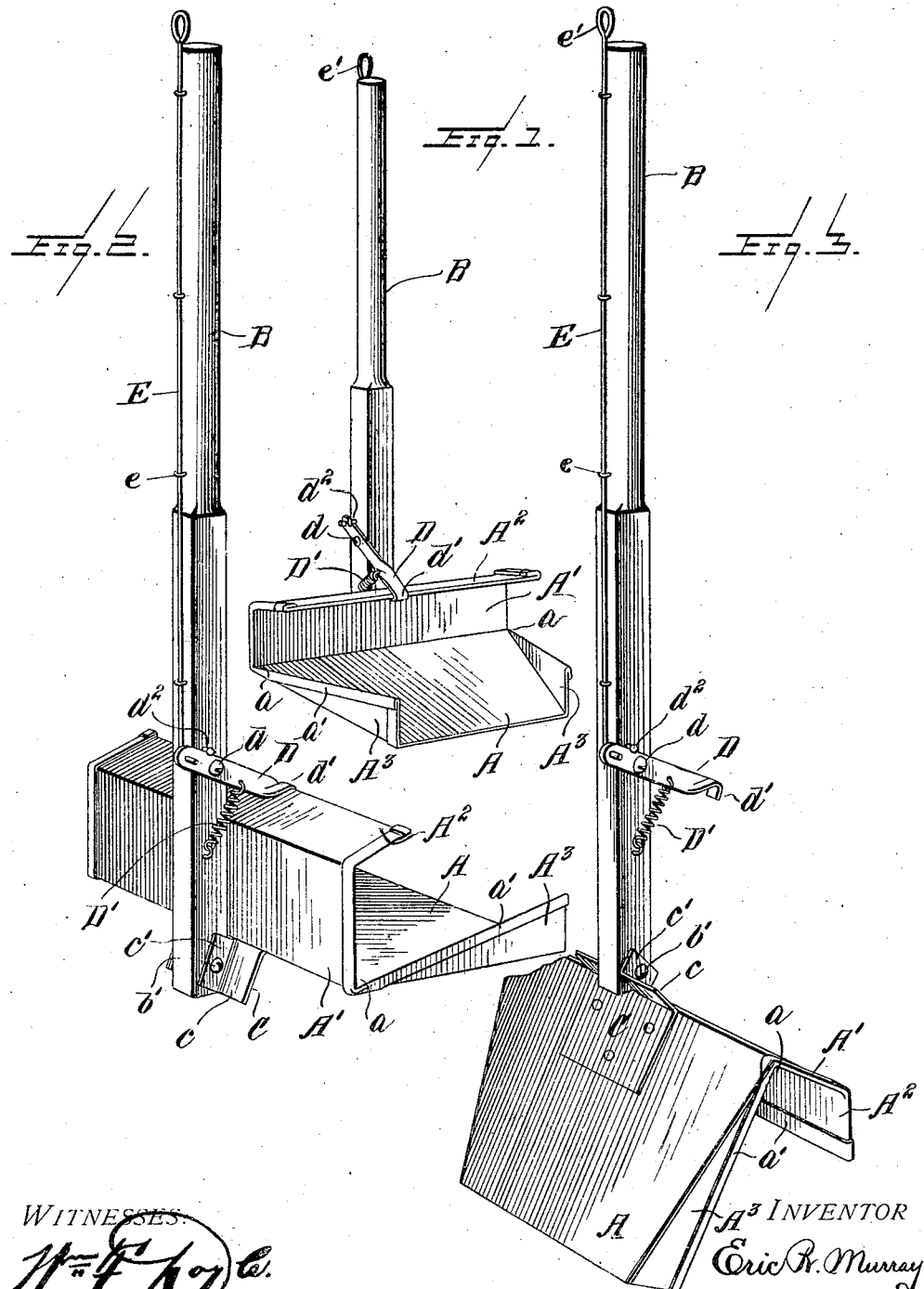

ERIC REED MURRAY, OF ORANGE, MASSACHUSETTS.

DUST-PAN.

No. 844,168.　　　Specification of Letters Patent.　　　Patented Feb. 12, 1907.

Application filed November 14, 1906. Serial No. 343,407.

*To all whom it may concern:*

Be it known that I, ERIC REED MURRAY, of Orange, in the county of Franklin and State of Massachusetts, have invented certain new and useful Improvements in Dust-Pans; and I hereby declare that the following is a full, clear, and exact description thereof, reference being had to the accompanying drawings, which form part of this specification.

This invention is an improved dust-pan or dirt-catching pan for use in houses and streets to facilitate the taking up of dirt.

The objects of the invention are to enable the dirt to be swept into the pan without the user having to stoop over to do so, as is necessary with ordinary hand dust-pans; also, to provide a dust-pan which will stand alone, so that the user can have both hands to manipulate the broom; also, to provide a pan which can be emptied at either end, so that the dirt therein can be readily dumped into a stove-hole or receptacle without spreading out, as it is apt to do when emptied from the mouth of the pan; also, to provide the pan with a hinged handle which can be locked at right angles to the pan, so as to facilitate the handling of the pan when in use; also, to provide a novel catch for locking the pan to the handle and which can be easily released when desired, so that the pan can swing in line with the handle and will lie closely against the wall when the handle is suspended on a nail, so that when not in use the pan is not cumbersome or in the way.

The invention consists in the novel construction of the pan, as illustrated in the drawings, and the features for which protection is desired are summarized in the claims.

In the drawings, Figure 1 is a front perspective view of the pan ready for use. Fig. 2 is an enlarged rear perspective view thereof. Fig. 3 is a further enlarged perspective view thereof, showing the pan dropped.

The dust-pan A is preferably made of sheet metal and can be made from an approximately rectangular oblong sheet. The rear part of such sheet is bent up at right angles, as at A', to form the back of the pan, and at top of part A' the sheet is bent forwardly again, as at $A^2$, forming a horizontally-projecting ledge, which serves to prevent sweepings being brushed over the rear edge of the pan and also serves as a knocking-strip against which the broom or brush can be rubbed or tapped to cause particles of dirt adhering thereto to drop into the pan.

The opposite ends and front corners of the sheet are turned up triangularly, as at $A^3$, forming sides of the pan, the apexes of the triangular portions pointing toward and adjoining part A', so as to leave practically unobstructed passages $a$ at the rear corners of the pan, so that dirt and sweepings collected in the pan can be poured out of either end thereof at the points $a$ by simply turning the pan to one side. This facilitates emptying of the pan into small receptacles. The edges of the several portions of the pan may be stiffened in any suitable manner, as by bending the edges of the sheet upon itself, as indicated at $a'$, so that the pan will hold its shape.

Preferably an angular piece of metal C is riveted or otherwise suitably secured to the pan, with its rear end depending therefrom, as at $c$, sufficiently to raise the rear edge of the pan slightly higher than its front edge, and thus when the pan is set upon the floor the pan will be tilted, so that its front edge lies close to the floor, and its bottom is slightly inclined in about the proper position to receive sweepings. The lower end of the handle B may be hinged to the piece C in any suitable manner. As shown, it is transfixed by a pin $b'$, that also transfixes ears $c'$ on parts $c$. The handle may be hinged by any other desired means, preferably, however, in such manner that it cannot vibrate or swing laterally of the pan. On the handle above the part A' of the pan is pivoted a catch D, which can be formed of a piece of strap metal pivoted on a pin $d$, attached to handle B and having a hook $d'$ on its forward end adapted to engage the front edge of part $A^2$ of the pan, as shown in Figs. 1 and 2, and when so engaged it locks the pan and handle at right angles to each other. The hook may be normally held in engaging position by a spring D', as shown, and its locking movement is limited by a stop-pin $d^2$, attached to the handle.

To the rear end of the catch D is pivotally connected the lower end of a trip-rod E, which extends upward along the handle through suitable guides $e$, attached thereto, which guides may be of any proper kind, being shown as staples in the drawings. The upper end of the rod may be provided with a ring $e'$, serving not only as a convenient means for manipulating the latch, but also as a convenient suspending device for the pan when not in use.

When the pan is in use, the handle is locked thereto, as shown in Figs. 1 and 2, and the user can readily move the pan about where desired and can sweep dirt thereinto without having to stoop over to do it, and as the pan can stand alone both hands may be used in sweeping, if desired. The pan can be emptied from either end and by turning it sidewise, as is evident, or it can be dumped by releasing the catch D by pushing rod E, so as to allow the pan to drop in line with the handle, as shown in Fig. 3. In the latter position the pan can be conveniently hung up. When it is desired to use the pan again, it can be swung on the pivot until flange $A^2$ snaps under catch D. Then it remains in position for use until again released.

The peculiar shape of the pan proper enables the dirt to be emptied out at either end or at the front, whichever is most convenient to the person using it. The handle is long enough to allow a person to use the dust-pan without stooping. It can be taken from the wall where it hangs, given a sharp snappy swing, so as to engage the pan with the catch, and it is ready for use. It can be set on the floor and will stand alone, enabling the broom to be used with both hands. When through with it, by pressing the ring on top of the handle the pan will be released, and it can then be hung up again.

Having described my invention, what I claim as new, and desire to secure by Letters Patent, is—

1. In a dust-pan, the combination of a pan having an upturned back portion $A'$, and its end portions $A^3$ upturned angularly in such manner as to leave passages $a$ for the dirt at each end of the pan and adjacent the back portion, so that the pan can be emptied by tilting it to either side; with a handle connected to the rear edge of the pan below the portion $A'$, substantially as described.

2. The herein-described dust-pan comprising a pan having an upstanding rear portion $A'$ provided with a forwardly-projecting flange $A^2$ on its upper edge; with a handle hinged to the rear edge of the bottom of the pan below the upstanding portion $A'$, and a catch D pivoted on the handle and adapted to overlie and engage the forwardly-projecting flange $A^2$ and lock the pan at right angles to the handle when the pan is swung to such position, and a catch-operating rod E connected with the handle and said catch, substantially as described.

3. In a dust-pan, the combination of a sheet-metal pan having an upstanding rear portion $A'$, provided with a forwardly-projecting flange $A^2$ on its upper edge, a hinge member C attached to the rear edge of the bottom of the pan and adapted to elevate its rear edge when resting upon the floor, and a handle pivoted to said hinge member below the bottom of the pan; with a catch D pivoted to the handle and adapted to engage the flange $A^2$ and lock the pan at right angles to the handle when the pan is swung into such position; a spring connected to the handle and catch for holding the catch in engaging position, and an operating-rod E connected with the handle and catch, substantially as described.

In testimony that I claim the foregoing as my own I affix my signature in presence of two witnesses.

ERIC REED MURRAY.

Witnesses:
E. J. WILBUR,
A. A. BOYCE.